Dec. 13, 1960  H. BAUMGARTNER  2,963,902
TORSIONAL VIBRATION PICKUP DEVICES
Filed Dec. 27, 1957

INVENTOR:
Hans BAUMGARTNER by Wenderoth, Lind & Ponack
Att'ys

United States Patent Office 2,963,902
Patented Dec. 13, 1960

2,963,902

TORSIONAL VIBRATION PICKUP DEVICES

Hans Baumgartner, Winterthur, Switzerland, assignor to Schweizerische Lokomotiv- und Maschinenfabrik, Winterthur, Switzerland Filed Dec. 27, 1957, Ser. No. 705,684

Claims priority, application Switzerland Dec. 29, 1956

2 Claims. (Cl. 73—70.1)

This invention relates to a torsional vibration pickup device of the type having a casing adapted to be coupled for rotation with the shaft to be tested, and a seismic inertia member resiliently connected to the casing in the direction of rotation, the angular displacements of said member relative to the casing being indicated by a measuring device.

In known devices of this type the shaft to be tested may stimulate the occurrence of natural oscillations which disturb the result of the observed measuring data. In order to avoid this inconvenience, it has been proposed to provide the pickup device with damping means. In known rotary vibration measuring apparatus or torsiographs a friction brake of the dry or fluid type is arranged between the two relatively oscillating bodies. Such arrangements however have not proved satisfactory in operation, since they produce great phase displacements, resulting in considerable distortion of the image of oscillations. It is an object of this invention to avoid these inconveniences.

According to the invention, the inertia member is formed by a completely closed hollow cylinder within which is arranged a body of revolution freely rotating in separate coaxial bearings in said hollow cylinder, the surface of said body being separated by viscous liquid filled gaps from the adjacent interior walls of the inertia member.

Instead of the conventional system with two masses (the second mass being infinitely great) the invention provides a system having three masses. It has been found that a device according to the invention can be used to measure oscillations having a frequency quite close to the natural frequency of the device without producing any substantial phase displacements. In contradistinction therewith, apparatus using the mentioned conventional damping means only give useful measuring data for oscillations having frequencies equal to 3 to 5 times the natural frequency of the apparatus.

An embodiment of a device according to the invention is shown in the accompanying drawing in which.

Figure 1:
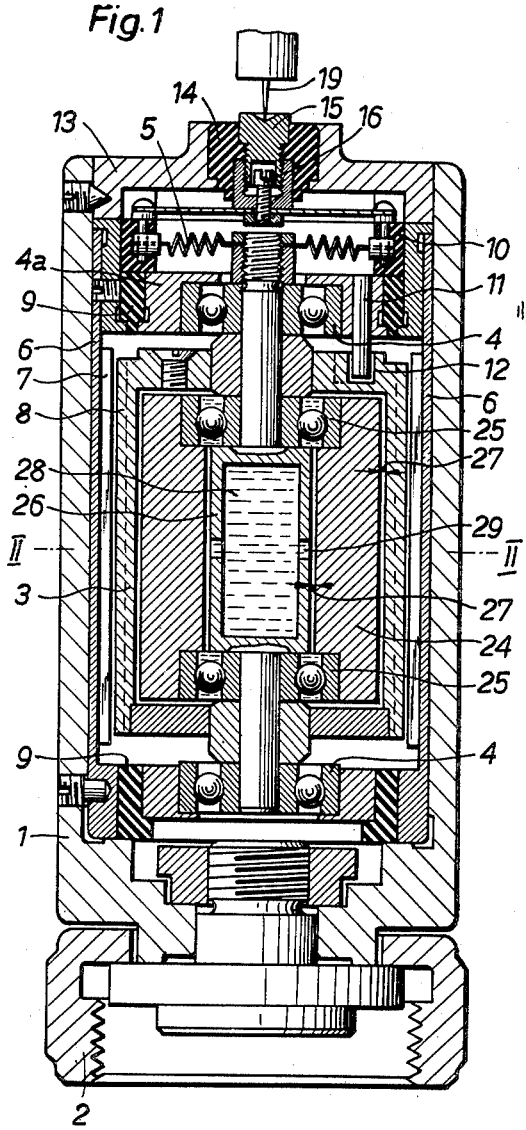
Figure 1 is a longitudinal sectional view of the device.
Figure 2:
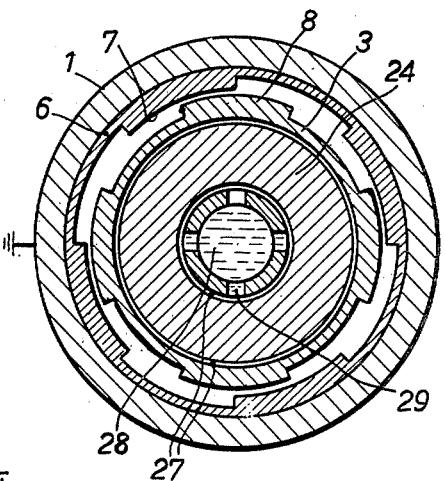
Figure 2 is a transverse section along the line II—II of Figure 1, somewhat distorted and drawn to a smaller scale
Figure 3:
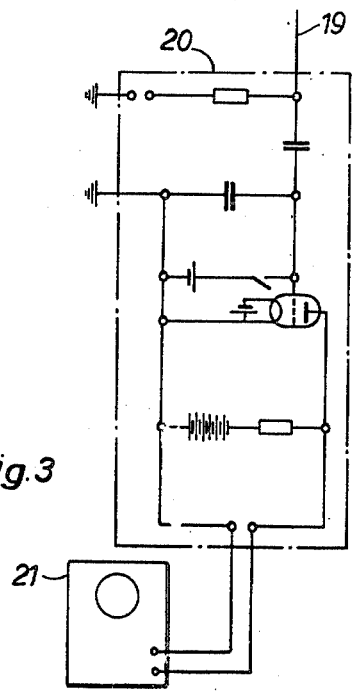
Figure 3 is the electric diagram of a measuring device.

The device for picking up torsional oscillations, also called torsion feeler, comprises a hollow cylindrical casing 1, which may be coupled for rotation with the shaft to be tested by means of a cap nut 2. A rotor 3 acting as seismic mass of rotation or inertia member is coaxially mounted on ball bearings 4 within the casing 1 and is elastically connected to the casing in the direction of rotation by two small springs 5. A pin 11 is secured to a supporting ring 4a and engages a circular arc-shaped groove 12 in the rotor 3 to limit relative movement of rotation between the two hollow cylinders 3 and 1.

The relative torsional movements between the casing 1 and the mass 3 occurring during a test are electrically measured, the torsiograph operating by way of changes of its capacity. The torsion feeler substantially represents a variable condenser rotating together with the shaft, the capacity thereof varying according to the relative torsional movements. These variations of the capacity are measured by means of an electrostatic measuring method and can be observed on the screen of a cathode ray oscillograph. For this purpose a cage 6 inserted into the casing 1 is provided with four segments 7 coacting with four corresponding segments 8 of the rotor 3 to form a condenser. Thus the whole torsion feeler forms a variable cylindrical condenser, the capacity of which varies with the position of the casing 1 relative to the mass 3. In order to provide for complete electrical insulation between the two condenser portions the ball bearings 4 are mounted in insulating sleeves 9 and the outer ends of the springs 5 are fixed to the casing 1 by the intermediary of an insulating sleeve 10. The cover 13 of the casing comprises an insulating plug 14 having inserted therein a needle guide 15 and a contact-pin 16. This needle guide 15 forms the electrical connection of the rotatable mass with the needle contact 19, an input amplifier 20 and, for example, a cathode ray oscillograph. In this manner the torsional oscillations of the shaft to be tested can be rendered visible on the screen of the oscillograph and at the same time photographically recorded.

In order to suppress the natural frequency of the rotor 3 and to obtain a flat resonance curve, damping means have been provided. For this purpose the rotor 3 is constituted by a completely closed hollow cylinder sealed and secured to the shaft 26. A second rotor or body of revolution 24 is mounted on ball bearings 25 and arranged coaxially within the rotor 3 and around an enlarged hollow section 28 of the shaft 26. The inner and outer surfaces of the second rotor 24 are separated from the adjacent outer surface of the shaft portion 28 and the inner surface of the rotor 3 by gaps 27. These gaps and other hollow spaces in the interior of the rotor 3 are filled with a viscous friction medium such as oil, having a viscosity which varies only slightly when the temperature changes.

The damping arrangement operates as follows: When the apparatus is connected to the rotating shaft to be tested, the body of revolution 24 is driven in the direction of rotation of the casing 1 owing to the action of the viscous oil filling the gaps 27. The rotor 24 then tends to maintain the rotational speed which it has attained and thus imparts a damping action on any oscillatory deflections of the rotor 3. Particularly greater oscillatory deflections in the zone of the natural frequency of rotational oscillations of the system are suppressed, the frictional forces between both rotary masses 3 and 24 consuming oscillatory energy of the rotary pendulum.

It is a known fact that the radial clearance of ball bearings is very small e.g. some thousandths of one millimetre, and the radial width of the gaps 27 is from two to four tenths of one millimetre. Therefore the width of the gaps, when the device is in use, can only vary in the order of the dimension of the bearing clearance. In addition the ball bearing has the advantage over sliding bearing contact that its resistance against rotation is exceptionally small and increases only slightly with increasing speeds. All of these qualities are of eminent importance in measuring instruments such as the described device, since they ensure constant measuring data at different temperatures, different speeds and different positions of the shaft to be tested.

In order to provide a storage space for the viscous friction medium the thickened inner part of the shaft 26 is hollow. The fluid in this space communicates through the holes 29 with the gaps 27. In this way small air bubbles which may be present in the fluid will be forced into the storage space when the device rotates, so that the gaps will be completely and uniformly filled with pure oil which is important for obtaining precise measuring data.

I claim:

1. A torsional vibration pickup device comprising a casing, means for coupling said casing to a shaft to be tested for rotation therewith, an inertia member formed by a completely closed hollow cylinder mounted for rotation within said casing, spring means resiliently interconnecting said inertia member and said casing in the direction of rotational movement, a shaft extending coaxially with the casing and carrying the inertia member, said member being secured and sealed to said shaft, a body of revolution mounted for free rotation within said hollow cylinder, and bearings for said body of revolution carried by said shaft, the surface of said body being separated by a viscous liquid filled gap from the inner surface of said hollow inertia member, said shaft having a central portion of larger diameter than the remainder of said shaft and inside of the body of revolution, a narrow radial gap being provided between the surface of said enlarged shaft portion and the interior surface of the body of revolution.

2. A torsional vibration pickup device comprising a casing, means for coupling said casing to a shaft to be tested for rotation therewith, an inertia member formed by a completely closed hollow cylinder coaxially mounted for rotation within said casing, spring means resiliently inter-connecting said casing and said inertia member in the direction of rotational movement, a shaft carrying the inertia member and longitudinally traversing said member, a body of revolution carried by said shaft within the hollow inertia member, the body of revolution being hollow and traversed by said shaft, the portion of the shaft within the body of revolution being hollow and forming a storage space for a viscous liquid, the outer surface of said enlarged shaft portion being separated by a radial gap from the inner surface of the body of revolution, and the outer surface of said body being separated by a radial gap from the inner surface of the hollow inertia member, both said gaps being filled with viscous liquid and communicating with said storage space in the enlarged shaft portion.

References Cited in the file of this patent
UNITED STATES PATENTS

| | | |
|---|---|---|
| 2,687,047 | O'Connor | Aug. 24, 1954 |
| 2,915,896 | Booth et al. | Dec. 8, 1959 |

FOREIGN PATENTS

| | | |
|---|---|---|
| 892,358 | France | Jan. 7, 1944 |
| 733,982 | Great Britain | July 20, 1955 |